United States Patent [19]

Schwartz

[11] 4,180,205
[45] Dec. 25, 1979

[54] PSEUDO RANGE AND RANGE RATE DEVICE

[75] Inventor: Arnold Schwartz, Silver Spring, Md.

[73] Assignee: The United States of America as represented by the Secretary of the Navy, Washington, D.C.

[21] Appl. No.: 179,529

[22] Filed: Mar. 9, 1962

[51] Int. Cl.$^2$ ............................................. F41G 7/00
[52] U.S. Cl. .................................... 235/411; 235/415; 364/458; 364/809
[58] Field of Search .......... 235/180, 185, 186, 61.5 D, 235/61.5 E, 184, 181, 411, 415; 35/10.4, 10.2; 364/458, 809

[56] References Cited

U.S. PATENT DOCUMENTS

| | | | |
|---|---|---|---|
| 2,385,334 | 9/1945 | Davey | 364/817 |
| 2,476,747 | 7/1949 | Lovell | 364/809 |
| 2,616,625 | 11/1952 | Griest et al. | 235/403 |
| 2,701,098 | 2/1955 | Townes | 235/401 |

*Primary Examiner*—Malcolm F. Hubler
*Attorney, Agent, or Firm*—R. S. Sciascia; Paul S. Collignon

EXEMPLARY CLAIM

1. An electrical circuit for the simultaneous solution of three equations comprising:
   three ganged potentiometers coupled to receive a common first voltage signal and to be driven by a first angular driving means;
   a pair of ganged potentiometers coupled to receive a common second voltage signal and to be driven by a second angular driving means;
   summing networks coupled to the outputs of each of two of said three ganged potentiometers and an output of each of said pair of said ganged potentiometers, respectively, to produce first and second sum voltage signals on outputs thereof, and a summing network coupled to the output of one of said three ganged potentiometers and the output of one of said first and second summing networks to produce a third sum voltage signal on an output thereof;
   attenuating means coupled to attenuate said third sum voltage signal in accordance with a third angular driving means, the attenuated third sum voltage signal output of said attenuating means coupled to control said second angular driving means whereby the first, second, and third angular drive means and the various voltage signal inputs coupled and arranged aforesaid provide three simultaneous equations of analog voltages in said three potentiometers and summing networks to produce said first and second sum voltage signal outputs as the solution in analog voltages.

10 Claims, 1 Drawing Figure

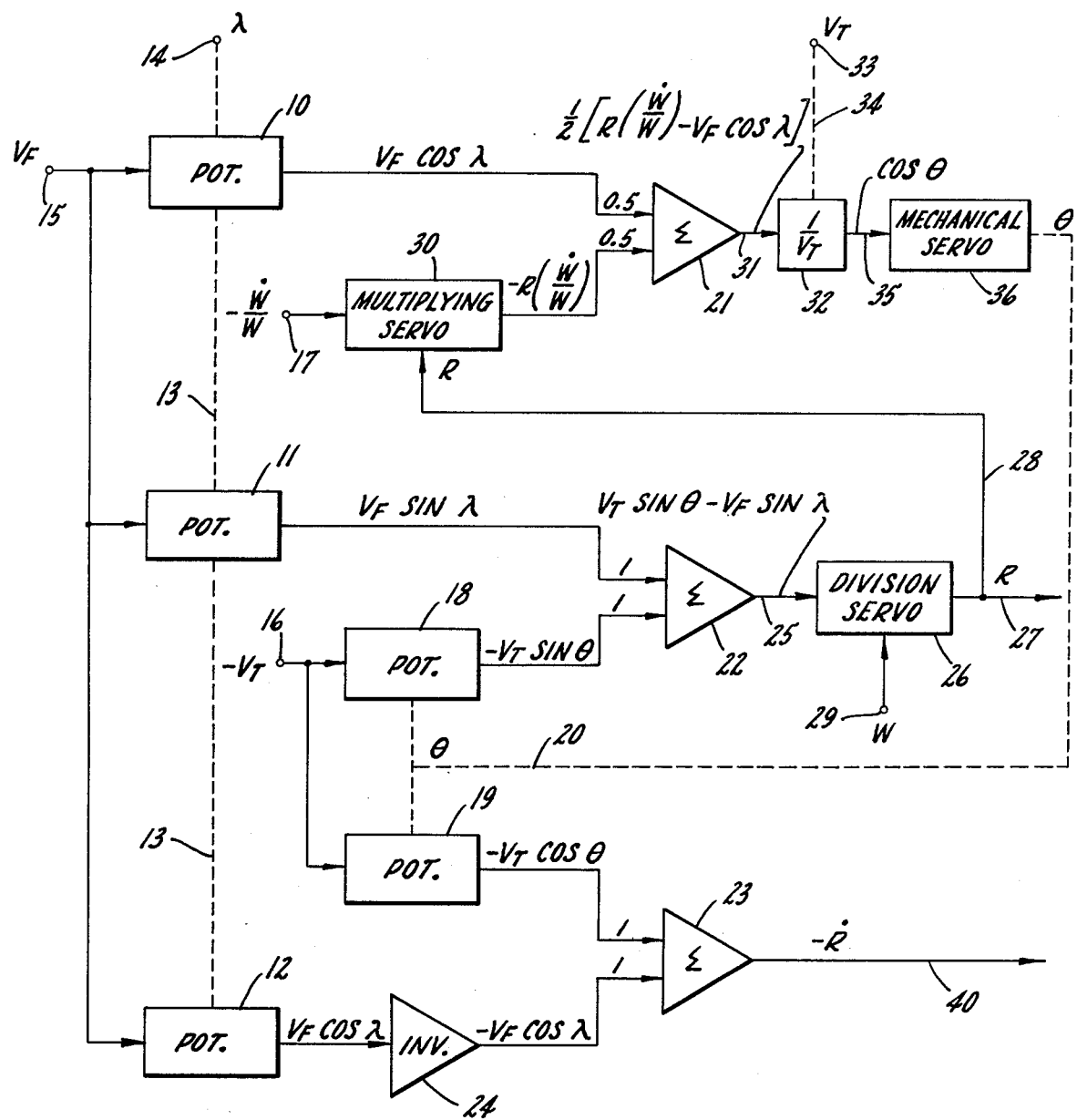

PSEUDO RANGE AND RANGE RATE DEVICE

This invention relates to range and range rate circuits of radar tracking systems and more particularly to circuits for deriving range and range rate analog voltage information from airborne equipment which obtains target information without obtaining range and range rate tracking information in a jam signal environment.

Launching of air-to-air guided missiles or projectiles against enemy aircraft from interceptor aircraft requires that range and range rate information be provided by the armament control system. Range and range rate data are used within the airborne interceptor aircraft weapon system ordinarily to compute steering equations for proper attack course, to prepare missiles for launching (for example, position range or velocity gate to enhance acquisition), to present tactical information to pilot's (and radar observer's) indicator (for example, closing rate, in-range, breakaway, etc.), and to give in-range indication to fire control circuits when missile launch requirements are satisfied.

In future air combat, the enemy will most probably employ electronic countermeasures (ECM) to frustrate the mission of our airborne weapon systems. Range and range rate information will be either badly degraded or denied. However, home-on-jam radar tracking systems and infrared tracking systems will provide angle tracking information. There are present developments of techniques for launching guided missiles in the absence of range and range rate information in which other target position information is used in substitution for the range and range-rate information. In this manner, enemy ECM to degrade or destroy range and range-rate information is avoided.

In the present invention the pseudo range and range rate device described herein is designed to operate in conjunction with the latter named airborne weapon systems which do not provide any range or range rate information. These latter named airborne weapon systems are referred to as missile attack range substitution systems, or MARS systems, which do provide for such information as the interceptor velocity, target velocity, the angular rate of change of the line of sight to the target, the time rate of change of this angular rate of change, and the interceptor lead angle measured from the line of sight. Three equations can be established from this MARS system information and these equations can be solved simultaneously to derive the range and range rate information. The means of solving these three equations simultaneously is accomplished by the use of three ganged potentiometers and two ganged potentiometers, and three ganged potentiometers having the interceptor velocity applied in common thereto and adjustably controlled proportional to the interceptor lead angle. The two ganged potentiometers have the target velocity applied in common thereto and are adjustably controlled in the angular relation by the angle measured off the target nose. The outputs from the three ganged and two ganged potentiometers are fed into summing circuits and through various division and multiplication circuits to produce the range and range rate information necessary for missiles or armament firing to destroy a target. It is therefore a general object of this invention to provide electrical means for deriving pseudo range and range rate signal information from information not including range and range rate signal information provided by MARS airborne weapon systems or the like to obtain the range and range rate signals necessary in the dispensing of missiles or projectiles, or in the direction of an aircraft, toward a target to be destroyed.

These and other objects and the attendant advantages, features, and uses of this invention may become more apparent to those skilled in the art as the description proceeds when considered in conjunction with the accompanying drawing illustrating a preferred form of the invention in block and schematic diagram.

Referring more particularly to the FIGURE of drawing, three potentiometers 10, 11, and 12, are ganged to be adjustably controlled in the operation of the adjustable contact therein through a mechanical coupling 13 driven from an initial source 14 proportional to the interceptor lead angle measured from the line of sight and indicated herein by the angle $\lambda$. Each of the three ganged potentiometers 10, 11, and 12 have a common voltage input at the terminal 15 applied thereto, the voltage applied to terminal 15 being the voltage representative of the interceptor velocity and herein designated by the reference symbol $V_F$. The potentiometers 10 and 12 of the three ganged potentiometer group are cosine function potentiometers which have resistance cards therein contoured in a manner to provide a cosine function of the input voltage in accordance with the adjustment of the adjustable tap, as well understood by those skilled in the potentiometer art. Potentiometers 10 and 12 will produce the function $V_F \cos \lambda$ on the output thereof. Potentiometer 11 of the three ganged potentiometer group has a resistance card therein to provide a sine function output and, accordingly, will produce on its output the function $V_F \sin \lambda$.

A pair of two ganged potentiometers 18 and 19 have a common input at 16 of an analog voltage representative of the target velocity and herein shown by the reference symbol $V_T$. The adjustable contacts of potentiometers 18 and 19 are driven proportional to the angle $\theta$, the derivation of which will later be described herein. The potentiometer 18 produces a sine function on its output while the potentiometer 19 produces a cosine function on its output. The output of potentiometer 18 will accordingly produce the function $V_T \sin \theta$ and the output of the potentiometer 19 will produce the function $V_T \cos \theta$ as illustrated in the drawing. For convenience in arriving at the solution desired, the input $V_T$ in common to potentiometers 18 and 19 is of negative polarity thereby producing the output functions in negative polarity. The mechanical means of driving the two ganged pair of potentiometers 18 and 19 proportional to the angle $\theta$ is by way of a shaft or other positive mechanical linkage, herein illustrated by the reference character 20.

The sine and cosine function outputs from the three ganged and two ganged potentiometers are applied to three summing amplifier circuits 21, 22, and 23. The analog voltage $V_F \cos \lambda$ output from potentiometer 10 is fed as one input to the summing amplifier 21, the analog voltage $V_F \sin \lambda$ of potentiometer 11 and the analog voltage $-V_T \sin \theta$ from potentiometer 18 are fed as inputs into the summing amplifier 22, and the analog voltage $-V_T \cos \theta$ output from potentiometer 19 and the analog voltage $V_F \cos \theta$ output of potentiometer 18, fed through an inverter circuit 24 to change the polarity, are fed as the two inputs to the summing amplifier 23. The functions $V_F \sin \lambda$ and $-V_T \sin \theta$ are summed at unity factor in the summing amplifier 22 to produce on the output 25 thereof the analog voltage representative of the sum $V_T \sin \theta - V_F \sin \lambda$. This output is applied as one input to a division servo 26 having as a second input at 29 an analog voltage representative of the angular rate of change of the line of sight and designated herein by the reference symbol w. The output of this division servo produces an analog voltage representative of the range of the target from the interceptor and is herein designated by the reference character R on the output conductor means 27. The analog voltage signal R is conducted by way of a branch conductor 28 to a multiplying servo 30 as one input thereto, the second input factor at 17 being the ratio of the time rate of change of the angular rate of change of the line of sight to the angular rate of change of the line of sight from the interceptor to the target, this ratio quantity being expressed by the reference symbols $\dot{w}/w$ and this quantity is expressed in negative polarity for convenience. The output of the multiplying servo 30 produces the product $-R(\dot{w}/w)$. This product quantity from the multiplying servo 30 is applied as a second input to the summing amplifier 21 this summing amplifier 21 having an amplification factor of 0.5 for each input to produce the sum $$\tfrac{1}{2}[R(\dot{w}/w) - V_F \cos \lambda]$$

on the output conductor 31. The quantity on the output conductor 31 is conducted through an adjustable attenuator 32 which is adjusted proportional to the analog voltage quantity $V_T$ applied at the control source 33 to adjust the attenuator 32 through the mechanical linkage 34. This attenuation is such that it substantially divides the quantity input from the conductor 31 by $V_T$ to produce on an output conductor 35 thereof the analog voltage representative of the cosine of the angle $\theta$. This cosine $\theta$ analog voltage on the conductor 35 is applied to a mechanical servo means 36 to cause the output shaft 20 thereof to be driven proportional to the angle $\theta$. Angle $\theta$ is representative of the angle measured off the target nose with respect to the line of sight between the interceptor and target. This output shaft 20 is mechanically coupled to drive the pair of ganged potentiometers 18 and 19, as hereinabove set forth.

The summing amplifier 23 sums the output functions from the potentiometer 19 and the potentiometer 12 at a factor of unity to thereby produce on the output conductor 40 thereof the analog voltage representative of the range rate represented herein by the reference character $\dot{R}$. Accordingly, range and range rate analog voltage signal information, R and $\dot{R}$, are derived on the output conductors 27 and 40 for use in missile launching equipment or other equipment requiring range and range rate for target destruction.

Airborne weapon systems, such as MARS hereinbefore referred to, are capable of producing the following analog voltage information:

$V_F$ = interceptor velocity
$V_T$ = target velocity
w = the angular rate of change of the line of sight
$\dot{w}$ = the time rate of change of w
$\lambda$ = the interceptor lead angle measured from the line of sight.
$\theta$ = angle measured off the target nose with respect to the line of sight. The development of the above analog voltage information is by MARS systems forming no part of this invention and this information will be used herein without derivation or explanation of the MARS system. The above quantities are all variables derived from the MARS operation and are available as inputs for computation in the device illustrated in the FIGURE. Range and range rate information can be derived from the simultaneous solution of the following three equations:

$$Rw = V_F \sin \lambda - V_T \sin \theta \tag{1}$$

$$\dot{R} = -V_T \cos \theta V_F \cos \lambda \tag{2}$$

$$R(\dot{w}/w) = 2V_T \cos \theta = V_F \cos \lambda \tag{3}$$

Equations (1) and (2) are basic and are derived from vector analysis of a pursuit course for interceptor and target aircraft. Equation (3) is derived from equations (1) and (2) thus:
Take the derivative of equation (1);

$$\dot{R}w + R\dot{w} = V_F \dot{\lambda} \cos \lambda - V_T \dot{\theta} \cos \theta$$

Since;

$$-\dot{\theta} = w,$$

Then;

$$\dot{R}w + R\dot{w} = V_F \dot{\lambda} \cos \lambda + V_T w \cos \theta$$

Dividing by w;

$$\dot{R} + R(\dot{w}/w) = (V_F \dot{\lambda} \cos \lambda /w) + V_T \cos \theta$$

Transposing $\dot{R}$;

$$R(\dot{w}/w) = (V_F \dot{\lambda} \cos \lambda /w) + V_T \cos \theta - \dot{R}$$

Since $(\dot{\lambda}/w)$ is substantially zero, the term $V_F \dot{\lambda} \cos \lambda /w$ can be evaluated as zero;

$$R(\dot{w}/w) = V_T \cos \theta - \dot{R}$$

Substituting the value of $\dot{R}$ from equation (2);

$$R(\dot{w}/w) = V_T \cos \theta - (-V_T \cos \theta - V_F \cos \lambda)$$

Or;

$$R(\dot{w}/w) = 2V_T \cos \theta + V_F \cos \lambda$$

These three equations are solved in the device shown in the FIGURE of drawing to produce range, R, and range rate, $\dot{R}$, on the outputs 27 and 40, respectively. On the output 31 of the summing amplifier 21 the summed quantity is shown as $\tfrac{1}{2}[R(\dot{w}/w) - V_F \cos \lambda]$. Substituting for $R(\dot{w}/w)$ in equation (3) its equivalent $2V_T \cos \theta + V_F \cos \lambda$ we arrive at the quantity $$\tfrac{1}{2}[2V_T \cos \theta + V_F \cos \lambda - V_F \cos \lambda]$$

in which event the $+V_F \cos \lambda$ and $-V_F \cos \lambda$ cancel leaving the quantity $\tfrac{1}{2}[2V_T \cos \theta]$. Again cancelling the $\tfrac{1}{2}$ and 2 we are left with the quantity $V_T \cos \theta$ on the output conductor 31 of the summing amplifier 21. By passing this quantity of $V_T \cos \theta$ through the attenuator 32, the $V_T$ is divided out and the input to the mechanical servo 36 is an analog voltage corresponding to $\cos \theta$ which is applied by way of the conductor 35 to the mechanical servo 36. Mechanical servo 36 is then driven by this analog voltage to drive its output shaft proportional to the angle $\theta$.

The output of the summing amplifier 22 on the output conductor 25 produces the summed quantity $V_T \sin \theta - V_F \sin \lambda$ which is equivalent to $Rw$ as shown by equation (1) above. By applying this quantity $Rw$ to the division servo with $w$ applied as the divisor, the $w$'s are cancelled out leaving the quantity $R$ representative of the analog voltage of range of the target from the interceptor.

The division, multiplying, and mechanical servos and the summing amplifier circuits, sine, and cosine potentiometers are of the conventional type used extensively in industry and will not be described herein. Working examples of these may be found in the text *Basics of Analog Computers* by T. D. Truitt and A. E. Rogers, published by the John F. Rider Publisher, Inc., New York, (1960).

In the operation of this device, let it be assumed that the several variables $V_F$, $V_T$, $w$, ($\dot{w}/w$), and $\lambda$, are applied to the terminals 15, 16, 29, 17, and 14, respectively. The three ganged potentiometers 10, 11, and 12 will be driven proportional to the angle $\lambda$ and the potentiometers 18 and 19 will be driven proportional to the angle $\theta$. Summation will take place in the summing amplifiers 21, 22, and 23 and the division and multiplying servos 26 and 30 will be operative to produce the output functions as shown to develop the angle $\theta$ on the output shaft 20 of the mechanical servo 36 to produce analog voltages representative of the range, $R$, and the range ratio, $\dot{R}$, on the output conductors 27 and 40. The analog voltages of $R$ and $\dot{R}$ can be used in lieu of the range and range rate signals ordinarily derived in range tracking radar whereby the possibility of the enemy's means of picking up range tracking radar signals is avoided and the ECM operation is ineffective in the present system to destroy the range and range rate signals derived thereby.

While many modifications and changes may be made in the constructional details and features of this invention by rearrangement of the components and elements to solve the three equations simultaneously, it is understood that I desire to be limited only by the scope of the appended claims.

I claim:

1. An electrical circuit for the simultaneous solution of three equations comprising:

three ganged potentiometers coupled to receive a common first voltage signal and to be driven by a first angular driving means;

a pair of ganged potentiometers coupled to receive a common second voltage signal and to be driven by a second angular driving means;

summing networks coupled to the outputs of each of two of said three ganged potentiometers and an output of each of said pair of said ganged potentiometers, respectively, to produce first and second sum voltage signals on outputs thereof, and a summing network coupled to the output of one of said three ganged potentiometers and the output of one of said first and second summing networks to produce a third sum voltage signal on an output thereof;

attenuating means coupled to attenuate said third sum voltage signal in accordance with a third angular driving means, the attenuated third sum voltage signal output of said attenuating means coupled to control said second angular driving means whereby the first, second, and third angular drive means and the various voltage signal inputs coupled and arranged aforesaid provide three simultaneous equations of analog voltages in said three potentiometers and summing networks to produce said first and second sum voltage signal outputs as the solution in analog voltages.

2. An electrical circuit as set forth in claim 1 wherein said first of said first and second sum voltage signals is divided by a third voltage signal and multiplied by a fourth voltage signal for application to said summing network for providing said third sum voltage signal, said divided sum voltage signal providing one of said desired voltage signal outputs.

3. An electric circuit as set forth in claim 2 wherein said three ganged potentiometers consist of two cosine function potentiometers and one sine function potentiometer, and said pair of ganged potentiometers consist of one cosine function potentiometer and one sine function potentiometer.

4. An electrical circuit as set forth in claim 3 wherein said sine function potentiometer of said three ganged potentiometers and said sine function potentiometers of said pair of ganged potentiometers have the outputs thereof coupled to the summing network for producing said first sum voltage signal, and said first sum voltage signal is said signal divided by said third voltage signal.

5. An electrical circuit as set forth in claim 4 wherein said equations solved by said circuit are:

$$Rw = V_F \sin \lambda - V_T \sin \theta$$

$$\dot{R} = -V_T \cos \theta - V_F \cos \lambda$$

$$R(\dot{w}/w) = 2V_T \cos \theta + V_F \cos \lambda$$

where $R$ is the range from the interceptor to a target, $w$ is the angular rate of change of the line of sight between said interceptor and the target, $\dot{w}$ is the time rate of change of $w$, $\dot{R}$ is the range rate, $V_F$ is the interceptor velocity, $V_T$ is the target velocity, $\lambda$ is the interceptor lead angle measured from the line of sight, and $\theta$ is the angle measured off the target nose, said first voltage signal is $V_F$, said first angular driving means is $\lambda$, said second voltage signal is $V_T$, said second angular driving means is $\theta$ developed by said third voltage signal output, said third voltage signal is $w$, said third angular driving means is $V_T$, and said fourth voltage signal is $\dot{w}/w$ to solve for $R$ and $\dot{R}$.

6. A pseudo range and range rate circuit for radar systems carried by interceptors comprising:

three ganged potentiometers coupled to receive a common first input voltage representative of the velocity of the interceptor and adjustably driven in angle corresponding to the interceptor lead angle measured from the line of sight to a target;

a pair of ganged potentiometers coupled to receive a common second input voltage representative of the velocity of the target and adjustably driven in angle proportional to the angle measured off the target nose;

three summing networks, each summing network having an input coupled to the output from a different one of said three potentiometers, two of said summing networks, each having an input coupled to the output of a different one of said pair of ganged potentiometers, said summing networks producing first, second, and third summed voltage outputs, said third summed voltage output being representative of the range rate of change of said target with respect to said interceptor;

a division servo means coupled to the second summed voltage output for division thereof by an applied voltage representative of angular rate of change of the line of sight between said interceptor and the target to produce an output voltage representative of the range of said target from said interceptor;

a multiplying servo coupled to receive a voltage representative of the ratio of the time rate of change to the angular rate of change of the line of sight to the target and said output voltage representative of range to generate a product signal, the product signal being applied to said summing network producing said first summed voltage;

a division network coupled to divide said first summed output voltage by an amount representative of said target velocity to produce a control voltage; and a mechanical servo coupled to receive said control voltage to drive said mechanical servo in angle proportional to said angle measured off the target nose, said mechanical servo being mechanically coupled to drive said pair of ganged potentiometers whereby the range and range rate analog voltages of the target are produced as said from said division servo means and said third summed voltage output, respectively.

7. A pseudo range and range rate circuit as set forth in claim 6 wherein said three ganged potentiometers consist of two cosine function potentiometers and one sine function potentiometer, and said pair of potentiometers consist of one sine function and one cosine function potentiometers.

8. A pseudo range and range rate circuit as set forth in claim 7 wherein said summing networks are summing amplifiers.

9. A pseudo range and range rate circuit for radar systems carried by an interceptor to solve three equations $Rw = V_F \sin \lambda - V_T \sin \theta$, $\dot{R} = V_T \cos \theta - V_F \cos \lambda$, and $R(\dot{w}/w) = 2V_T \cos \theta + V_F \cos \lambda$ to produce the range R and range rate $\dot{R}$ of a target therefrom where w is the angular rate of change of the line of sight of the target in analog voltage, $\dot{w}$ is the time rate of change of w in analog voltage, $V_F$ is an analog voltage representative of interceptor velocity, $V_T$ is an analog voltage representative of the target velocity, $\theta$ is the angle measured off the target nose, and $\lambda$ is the interceptor lead angle measured from the line of sight to the target comprising:

three ganged potentiometers adapted to receive $V_F$ in common and adjustable proportional to $\lambda$, the first and third of said three ganged potentiometers producing cosine function outputs and the second of which produces a sine function output;

a pair of ganged potentiometers adapted to receive $V_T$ in common and adjustable proportion to $\theta$, one of said pair of ganged potentiometers producing a cosine function on an output thereof and the other producing a sine function on an output thereof;

three summing networks, the first of which is coupled to receive the cosine function output of the first three ganged potentiometers, the second of which is coupled to receive the sine function output from the second three ganged potentiometers and the sine function output of the pair of ganged potentiometers, and the third of which is coupled to receive the cosine function output from the third of said three ganged potentiometers and the cosine function output from said pair of ganged potentiometers, the output of said third summing network producing said $\dot{R}$;

a division servo coupled to receive the output of said second summing network as a dividend and to receive w as a divisor, the quotient therefrom being R;

a multiplying servo coupled to said division servo output to receive R and having $\dot{w}/w$ applied thereto to produce the product of an output thereof applied as a second input to said first summing network;

an attenuating network coupled to said first summing network output and adjustable in attenuation proportional to the value of $V_T$ thereby dividing out a factor of $V_T$ from the output of said first summing network on an output thereof; and a mechanical servo coupled to the output of said attenuating network for controlling the angle of the output shaft thereof proportional to the angle $\theta$, said output shaft being mechanically coupled to said pair of ganged potentiometers to make said adjustment proportional to $\theta$ whereby the desired outputs of R and $\dot{R}$ are produced as analog voltages at the outputs of said division servo and the output of said third summing network, respectively.

10. A pseudo range and range rate circuit as set forth in claim 9 wherein said summing networks are summing amplifiers.

* * * * *